US011289783B2

(12) United States Patent
Mao et al.

(10) Patent No.: US 11,289,783 B2
(45) Date of Patent: Mar. 29, 2022

(54) TRANSPORT SYSTEM FOR CONVERTIBLE BATTERY PACK

(71) Applicant: Globe (Jiangsu) Co., Ltd., Jiangsu (CN)

(72) Inventors: Wei Mao, Jiangsu (CN); Chuanjun Liu, Jiangsu (CN); Xinzhong Guo, Jiangsu (CN); Doushi Wang, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 134 days.

(21) Appl. No.: 16/700,270

(22) Filed: Dec. 2, 2019

(65) Prior Publication Data

US 2020/0176724 A1 Jun. 4, 2020

(30) Foreign Application Priority Data

Nov. 30, 2018 (CN) .......................... 201811457229.2

(51) Int. Cl.
*H01M 50/543* (2021.01)
*H01M 10/04* (2006.01)
*H01M 50/502* (2021.01)

(52) U.S. Cl.
CPC ..... *H01M 50/543* (2021.01); *H01M 10/0445* (2013.01); *H01M 50/502* (2021.01)

(58) Field of Classification Search
CPC ............. H01M 50/543; H01M 50/502; H01M 50/256; H01M 50/20; H01M 10/0445; H01M 50/213; B25F 5/02; B25F 5/00; H02H 7/18; H02J 7/0029; H02J 7/00306; H01R 31/06
See application file for complete search history.

(56) References Cited

U.S. PATENT DOCUMENTS

| | | |
|---|---|---|
| 9,583,745 B2 | 2/2017 | White et al. |
| 2011/0250484 A1 | 10/2011 | Meng |
| 2016/0126533 A1* | 5/2016 | Velderman ........ H01M 10/4207 429/97 |
| 2017/0072553 A1 | 3/2017 | Bakker |
| 2017/0104243 A1 | 4/2017 | Velderman et al. |

* cited by examiner

*Primary Examiner* — Matthew T Martin
*Assistant Examiner* — Adam J Francis
(74) *Attorney, Agent, or Firm* — Rooney IP, LLC

(57) ABSTRACT

A battery pack transport system includes a battery pack and a protective member assembled on the battery pack for preventing the battery pack from damage during shipping. The battery pack includes two battery cell groups each having a positive electrode and a negative electrode and a female connector electrically connected to two battery cell groups to connect two battery cell groups in parallel. The protective member engages with the female connector to change two battery cell groups from parallel connected state to isolated state.

18 Claims, 10 Drawing Sheets

TRANSPORT SYSTEM FOR CONVERTIBLE BATTERY PACK

CROSS-REFERENCE TO RELATED APPLICATIONS

This application is a US application which claims the benefit of priorities to Chinese Patent Application No. CN201811457229.2 titled "Transport System for Convertible Battery Pack", filed to the Chinese State Intellectual Property Office on Nov. 30, 2018, the entire disclosures of which are incorporated herein by references.

TECHNICAL FIELD

The present invention relates to rechargeable battery pack and systems for safety transporting the battery pack.

BACKGROUND

Conventional rechargeable battery packs include a plurality of lithium-ion battery cells. Due to the nature of the chemistry of these battery packs, a lot of combustion and explosion accidents are caused by improper packaging and transportation of the battery packs, therefore many countries and international bodies have implemented special rules directed to the shipping of Lithium-ion batteries. If a battery or battery pack exceeds these limits, there are additional fees and shipping costs for shipping the battery pack. As such, there is an interest in keeping the watt-hour levels below the 100 WH limits. Today, it is common for Lithium-ion batteries to exceed these limits. As battery power and capacity increases, it will become more common for batteries to exceed these limits. As such, there is a great desire to keep the battery packs below these limits.

Typically, shipping regulations pose limitations on how much energy is disposed in a battery pack. For example, some regulations require that each battery cell has an energy equal to or less than 20-watt hours, and each battery pack has an energy limit equal to or less than 100-watt hours. However, as the demand for large-capacity, high-power battery packs is increasing, most lithium-ion battery packs have exceeded the limits of these transport regulations, and transport costs of these products are increased. Furthermore, as the battery pack power and capacity increase, it becomes more and more common for battery packs to exceed these limitations.

Therefore, there is a requirement to provide an improved battery pack transport system for protecting the battery pack from damaging during shipping.

SUMMARY OF THE INVENTION

The present invention provides a battery pack transport system for safely shipping battery pack and reducing cost.

In an aspect, a battery pack transport system comprises: a battery pack and a protective member mechanically coupled to the battery pack, the battery pack including a first cover; a second cover mounted to the first cover; a battery module received in a receiving space formed between the first and second covers and a female connector connected to the battery module; the battery module having two battery cell groups each configured with a plurality of cells and having a positive electrode and a negative electrode, the female connector having a plurality of conductive terminals respectively and electrically connected to positive and negative electrodes of two battery cell groups, two conductive terminals with same polarity being connected with each other, two battery cell groups connected with each other in parallel; the protective member changing the electrical connection of two conductive terminals with same polarity from parallel connected state to isolated state.

In one embodiment, two battery cell groups are isolated with each other when the protective member is coupled to the battery pack.

In one embodiment, the protective member has a plurality of inserting portions corresponding to the conductive terminals of the battery pack, and the inserting portions each is connected to corresponding conductive terminal.

In one embodiment, the female connector has a converter slidably received therein, and the converter includes a plurality of inner contacts corresponding to the conductive terminals, and each inner contact is simultaneously connected to two conductive terminals with same polarity before the protective member coupled to the battery pack.

In one embodiment, the converter includes a protruding portion forwardly extending therefrom, and the protective member defines a protrusion corresponding to the protruding portion, and the protrusion abuts against the protruding portion to drive the converter move away from the conductive terminals.

In one embodiment, the female connector defines a guiding rail for receiving the protruding portion of the converter, and the protruding portion slides along the guiding rail when abutted by the protrusion of the protective member.

In one embodiment, the converter has a plurality of posts opposite to the protruding portion and a plurality of elastic members respectively assembled to the corresponding post, and the elastic members are sandwiched between the sidewall of the female connector and the converter.

In one embodiment, the elastic members are compressed when the converter moves away from the conductive terminals under the pushing of the protective member, and the elastic members recover from deformation to drive the converter mover towards the conductive terminals when the protective member is separate with the battery pack.

In one embodiment, the battery pack has a locking portion protruding above the top of the upper cover, and the protective member has a groove upwardly depressed from the bottom thereof for receiving the locking portion of the battery pack.

In one embodiment, the female connector also has a pair of ribs located at two opposite sides of the guiding rail.

In another aspect, a battery pack comprising: a first and second cover forming a receiving space together; a battery module received in the receiving space and having two battery cell groups each including a plurality of cells connected in series, a positive electrode and a negative electrode; a female connector electrically connected to the battery module and having a plurality of conductive terminals respectively and electrically connected to positive and negative electrodes, a converter electrically connecting two conductive terminals with same polarity in series to make two battery cell groups connected in parallel; and a couple coupled to the female connector to make two battery cell groups isolated with each other through separating two series connected conductive terminals with same polarity.

In one embodiment, the couple includes a protrusion extending therefrom, and the converter has a protruding portion corresponding to the protrusion, and the female connector has a guiding rail for receiving the protrusion and the protruding portion.

In one embodiment, the female connector has a pair of ribs located at two opposite sides of the protruding portion.

In one embodiment, the converter has a plurality of inner contacts received therein, and each inner contact is simultaneously connected to two adjacent conductive terminals with same polarity before the couple mounted to the female connector.

In one embodiment, the couple is removably assembled to the female connector, and the couple has a plurality of inserting portion corresponding to the conductive terminals.

In one embodiment, the converter has at least one post located at opposite side of the protruding portion, and the female connector has at least one positioning column corresponding to the post, and at least one elastic member is sandwiched between the positioning column and the post.

In one embodiment, the converter is slidably received in the female connector and moves in a front-to-rear direction along the guiding rail.

In one embodiment, the inner contacts are separate with corresponding two conductive terminals with same polarity when the couple mounted to the female connector.

In one embodiment, a battery pack further includes a locking assembly sandwiched between the upper cover and the battery module.

In another aspect, a battery pack comprising: a battery module having two battery cell groups, a female connector connected to the battery module and a couple engaged with the female connector, each battery cell group configured with a plurality of cells connected in series and having a positive electrode and a negative electrode, the female connector having a plurality of conductive terminals connected to the positive and negative electrodes of the battery module to connect two battery cell groups in parallel through connecting two conductive terminals with same polarity; the couple changing two conductive terminals with same polarity from parallel connected to isolated.

DETAILED DESCRIPTION

In order to clarify the objects, characteristics and advantages of the present invention, embodiments of the present invention will be described in detail in conjunction with the drawings.

FIG. 1 to FIG. 12 illustrate a battery pack transport system 100 in accordance with one embodiment of the present invention. FIG. 13 to FIG. 16 illustrate a battery pack transport system 100' in accordance with another embodiment of the present invention. The system 100, 100' in two different embodiments have the same battery pack 200 but different protective member 600, 700.

Figure 1:
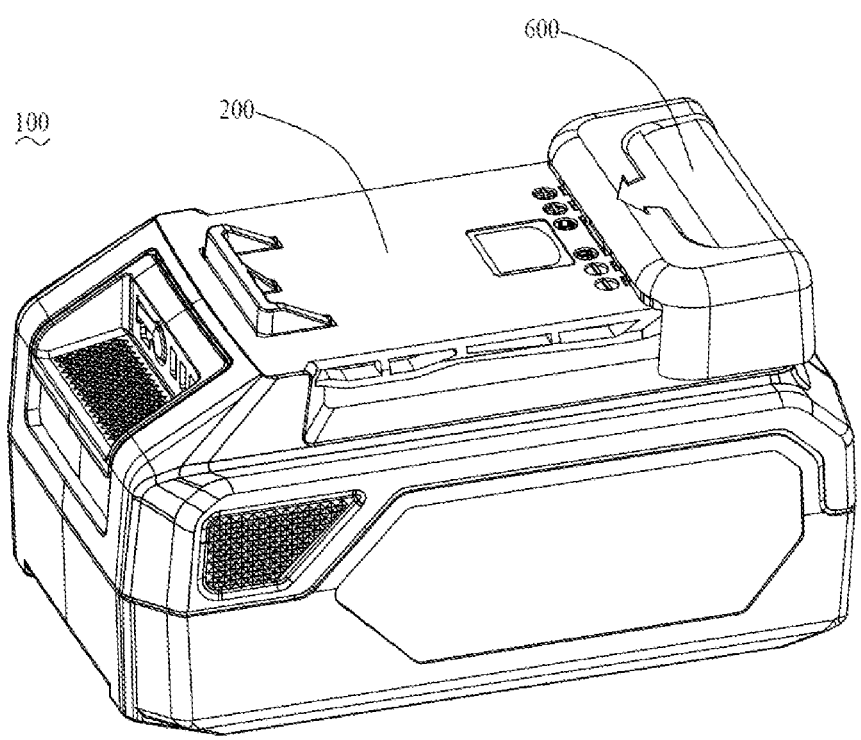
FIG. 1 is a schematic view of a battery pack transport system according to the first embodiment of the present invention, showing a protective member being assembled on a battery pack.
Figure 2:
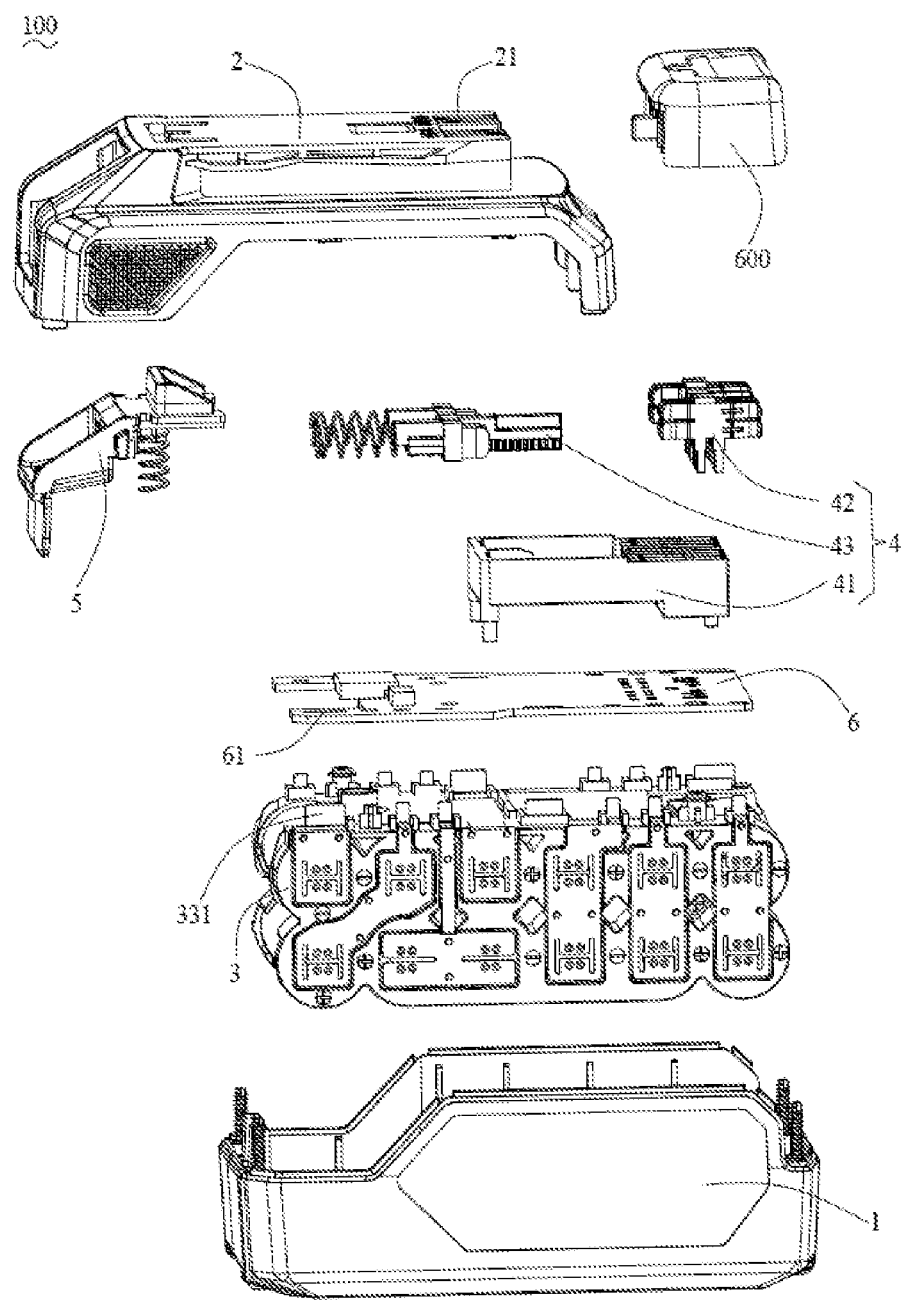
FIG. 2 is an exploded and perspective view of the battery pack transport system shown in FIG. 1.

As shown in FIG. 1 and FIG. 2, the battery pack transport system 100 according to the first embodiment of the present invention includes a battery pack 200 and a protective member 600 coupled to the battery pack 200 for protecting the battery pack 200 from damaging during shipping. The battery pack 200 for supplying power to corresponding power tool (not shown) connected thereto includes a lower cover 1, an upper cover 2 mounted on the lower cover 1, a battery module 3 received in a receiving space formed between the lower and upper covers 1, 2, a printed circuit board (PCB) 6 mounted on the battery module 3, a female connector 4 assembled to the battery module 3 through the PCB 6 and a locking assembly 5 assembled on the upper cover 2 for locking the battery pack 100 to the power tool (not shown) or releasing the battery pack 100 from the power tool (not shown).

Figure 8:
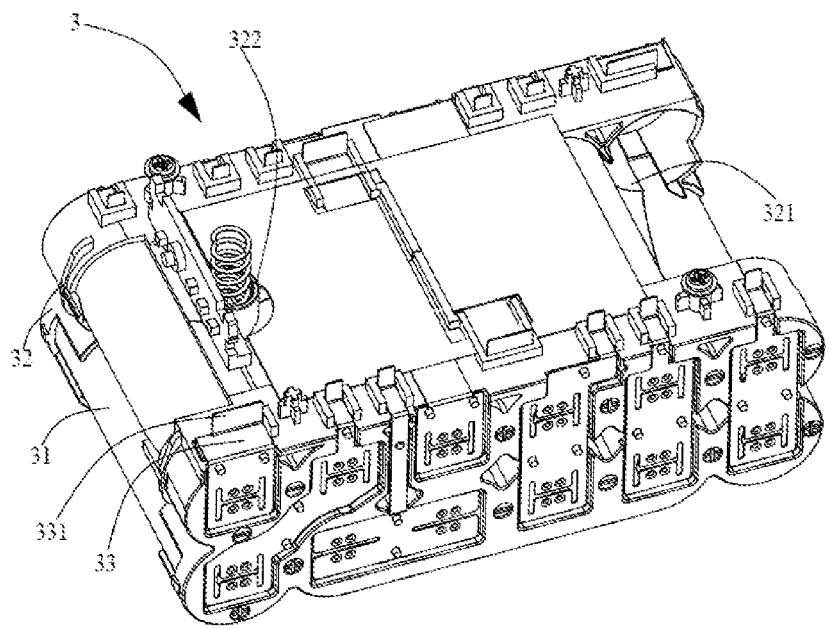
FIG. 8 is a perspective view of a battery module of the battery pack shown in FIG. 2.
Figure 9:
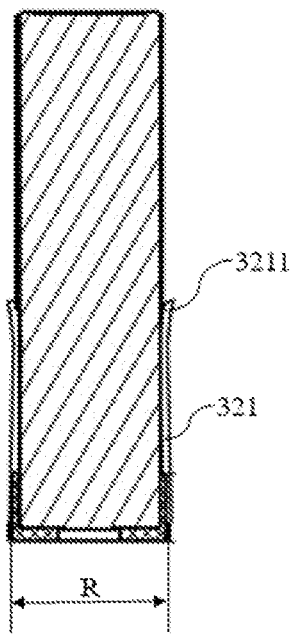
FIG. 9 is a sectional view of a cell holder of the battery module shown in FIG. 8.
Figure 10:
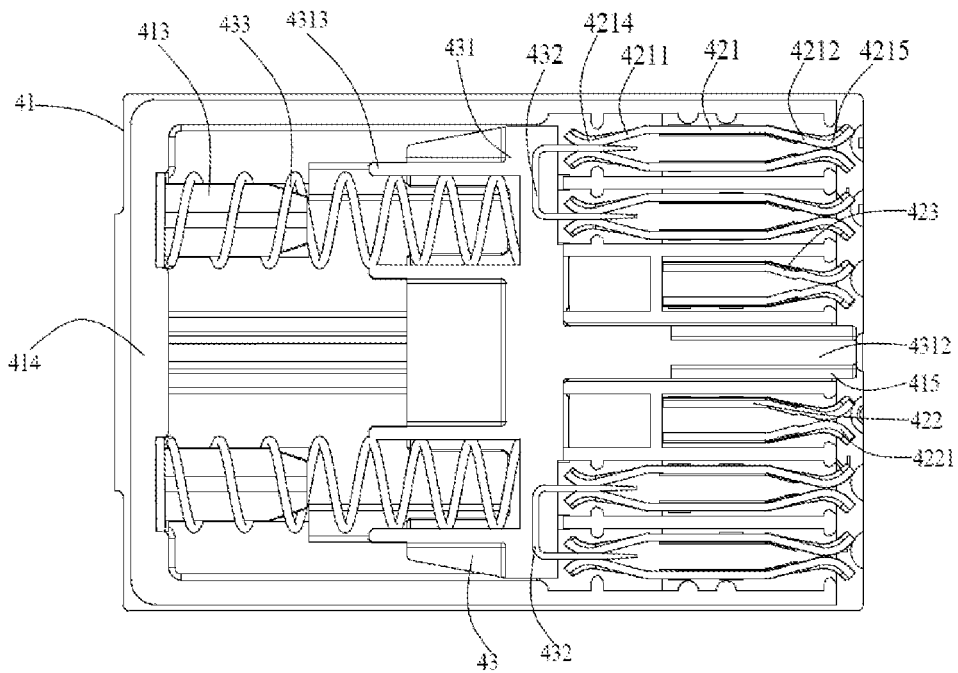
FIG. 10 is a sectional view of the battery pack in FIG. 1, showing the electrical connection of the female connector in the battery pack.

Referring to FIG. 8 and FIG. 9, the battery module 3 includes a plurality of cells 31, a cell holder 32 for housing the cells 31 and a plurality of nickel strips 33 for electrically connecting the cells 31. The cell holder 32 has a diameter larger than that of each cell 31. Each cell holder 32 has four guiding portions 321 for guiding the cell 31 therein. Each guiding portion 321 has a chamfer 3211 located at the end thereof for easily inserting the cell 31 into the cell holder 32. The cell holder 32 also has a positioning portion 322 extending upwardly from the top thereof. The positioning portion 322 is configured with a hollow cylinder shape.

The cells 31 electrically connected by the strips 33 are divided into two battery cell groups. The cells 31 in each battery cell group are connected with each other in series. Each battery cell group has a positive electrode and a negative electrode respectively connected to the strips 33. Each strip 33 defines a convex tab 331 extending upwardly therefrom. The PCB 6 has a plurality of holes 61 corresponding to the convex tabs 331. Each convex tab 331 of the strips 33 passes through the corresponding hole 61 of the PCB 6 and is soldered to the PCB 6 to achieve the electrical connection between the battery module 3 and the PCB 6.

Two battery cell groups are electrically connected to the female connector 4 through electrically connecting the convex tabs 331 of the strips 33 to the female connector 4 by the PCB 6, so that the electrical connection between the female connector 4 and the battery module 3 is achieved. Each battery cell group has a "n" voltage. The battery module 3 can output a "n" voltage when two battery cell groups are connected with each other in parallel and a "2n" voltage when two battery cell groups are connected with each other in series.

Referring to FIG. 2, the female connector 4 supplying power from the battery module 3 to corresponding power tool includes a housing 41 mounted upon the battery module 3 through the PCB 6, a plurality of terminals 42 received in the housing 41, and a converter 43 retained in the housing 41 for switching the electrical connection of two battery cell groups in two states. One state of two battery cell groups is parallel connected state, and the other state of two battery cell groups is isolated state.

Figure 7:
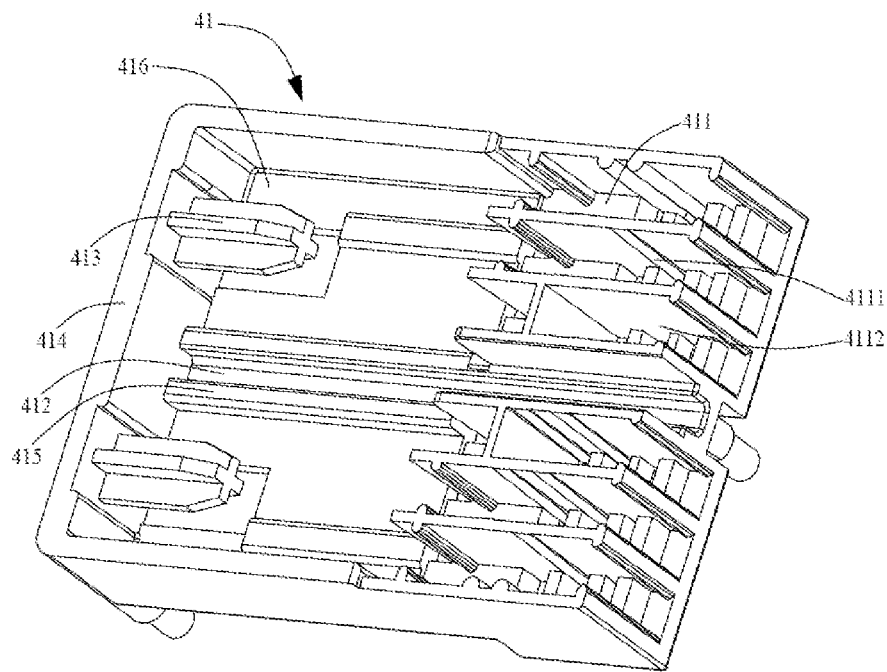
FIG. 7 is a perspective view of a housing of the female connector shown in FIG. 2.

Referring to FIG. 7, the housing 41 configured with a rectangular shape has an accommodating space 416 surrounded by three sidewalls thereof and a plurality of terminal receiving slots 411 opposite to the accommodating space 416. The upper cover 2 defines a plurality of through slots 21 corresponding to the terminal receiving slots 411 for guiding corresponding portion of protective member 600. The accommodating space 416 is depressed from the top of the housing 41 for receiving the converter 43. The terminal receiving slots 411 horizontally extend along a length direction of the housing 41 for respectively receiving the terminals 42. The receiving slots 411 are configured with two different structures. One is the first receiving slots 411 and communicated with the accommodating space 416. The other is the second receiving slot 4112 and separated with the accommodating space 416. A pairs of positioning columns 413 horizontally extend towards the accommodating space 416 from the sidewall 414 of the housing 41. The housing 41 defines a guiding rail 412 for guiding the converter 43 move along a front-to-rear direction in the accommodating space 416. The guiding rail 412 extends along the length direction of the housing 41. The guiding rail 412 passes through the accommodating space 416 and located in the middle of the receiving slots 411. A pair of ribs 415 are disposed at two opposite sides of the guiding rail 412 for preventing the converter 43 from separating with the housing 41.

Figure 6:
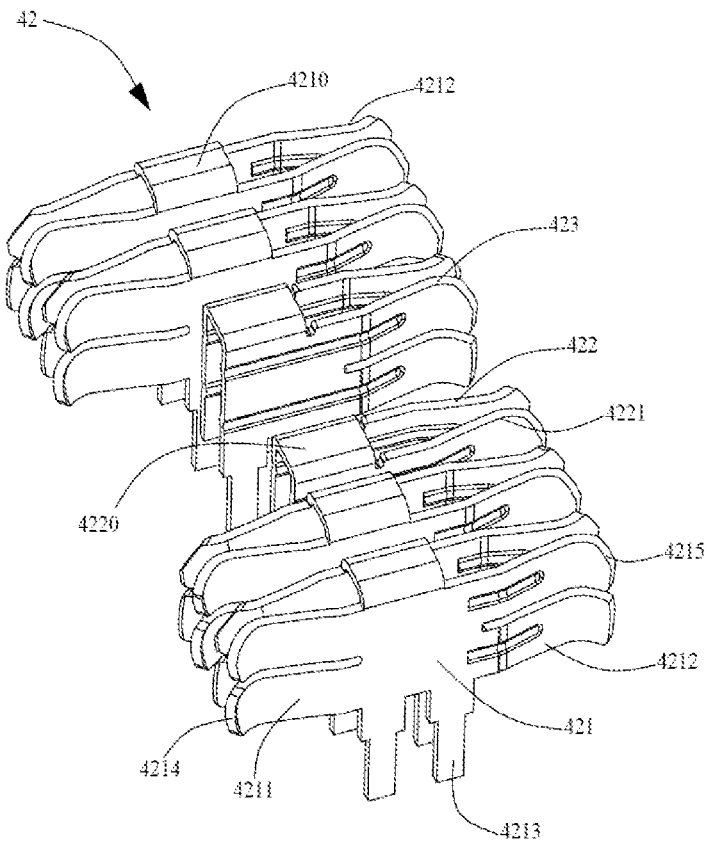
FIG. 6 is a perspective view of terminals of a female connector shown in FIG. 2.

Referring to FIG. 6, the terminals 42 received in the housing 41 for achieving the electrical connection between the power tool (not shown) and the battery module 3 includes two pair of conductive terminals 421 and one communication terminal 422 and one charging terminal 423 disposed in the same row. The conductive terminals 421 are received in the first receiving slots 4111 of the housing 41. The communication and charging terminals 422, 423 received in the second receiving slot 4112 of the housing 41 are adjacently disposed in the middle of the terminals 42. The communication terminal 422 disposed in the middle of four conductive terminals 421 are electrically connected to the PCB 6 for achieving the communication between the battery pack 200 and the power tool. The charging terminal 423 is used for charging the battery pack 200 when the battery pack 200 is connected to an external charging device (not shown). And two pair of conductive terminals 421 are respectively located at two opposite sides of the communication and charging terminals 422, 423. The conductive terminals 421 located at the same side of the communication and charging terminals 422, 423 has same polarity. The conductive terminals 421 disposed at two opposite sides of the communication and charging terminals 422, 423 have different polarities. Four conductive terminals 421 are configured with same structure. The communication and charging terminals 422, 423 are configured with same structure but different with that of the conductive terminals 421. Four conductive terminals 421 are respectively and electrically connected to positive or negative electrodes of corresponding battery cell groups through the PCB 6 electrically connecting the conductive terminals 421 to corresponding convex tabs 331 of the battery module 3.

Each conductive terminal 421 has a U-shaped main portion 4210, a pair of contacting arms 4211 extending backwardly from the main portion 4210, a pair of clamping arms 4212 extending forwardly from the main portion 4210, and a plurality of soldering pins 4213 extending downwardly from the main portion 4210. Two contacting arms 4211 are disposed at two opposite ends of the main portion 4210 and located at the same side of the main portion 4210. Each contacting arm 4211 extends horizontally from corresponding side of the main portion 4210 and defines a pair of contacting ends 4214 branched at the end thereof. Two clamping arms 4212 are disposed at another two opposite ends of the main portion 4210 and located at the other same side of the main portion 4210. Each clamping arm 4212 extends horizontally form corresponding side of the main portion 4210 and defines a pair of clamping ends 4215 branched at the end thereof. Two clamping arms 4212 and two contacting arms 4211 are disposed at two opposite sides of the main portion 4210. The soldering pins 4213 are soldered to the PCB 6 to achieve the electrical connection between the female connector 4 and the battery module 3 when inserted into the PCB 6. The contacting arms 4211 can be connected to the converter 43 to achieve the parallel connection of two battery cell groups. The clamping arms 4212 can be connected to corresponding terminals of the power tool to achieve the electrical connection between the battery pack 200 and the corresponding power tool. Two battery cell groups can be switched between parallel connected state and isolated state through the contacting arms 4211 of the terminals 42 connected or disconnected to the converter 43.

The communication terminal 422 has a U-shaped base portion 4220, a pair of connecting arms 4221 extending forwardly from the base portion 4220 and a plurality of contacting pins extending downwardly from the bottom of the base portion 4220. The connecting arms 4221 horizontally extends from two opposite ends of the base portion 4220 and are disposed at the same side of the base portion 4220. The connecting arms 4221 can achieve the communication function between the battery pack 200 and the corresponding power tools when the battery pack 200 is coupled to the power tool. The contacting pins are soldered to the PCB 6 to achieve the electrical connection between the communication terminal 422 and the battery module 3. The connecting arms 4221 of the communication terminal 422 are located at the same side with the clamping arms 4212 of the conductive terminals 421.

Figure 4:
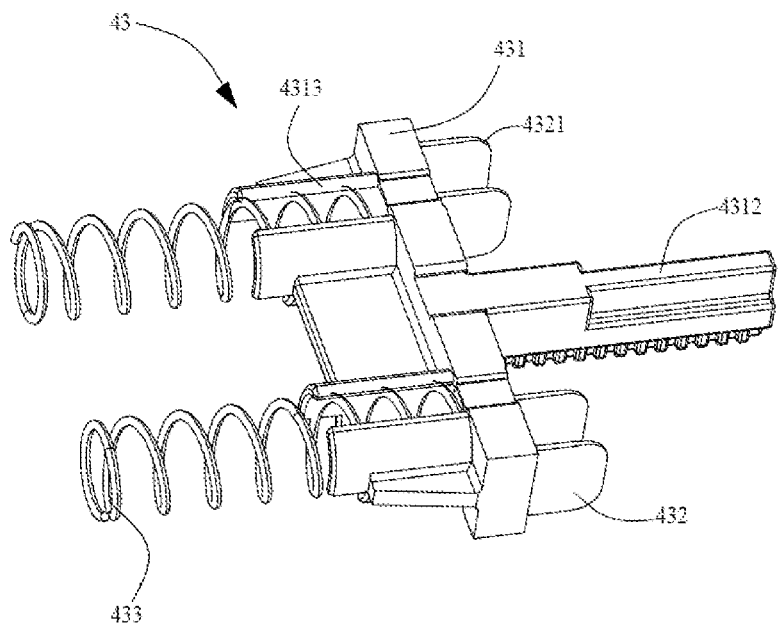
FIG. 4 is a perspective view of a converter of the battery pack shown in FIG. 2.
Figure 5:
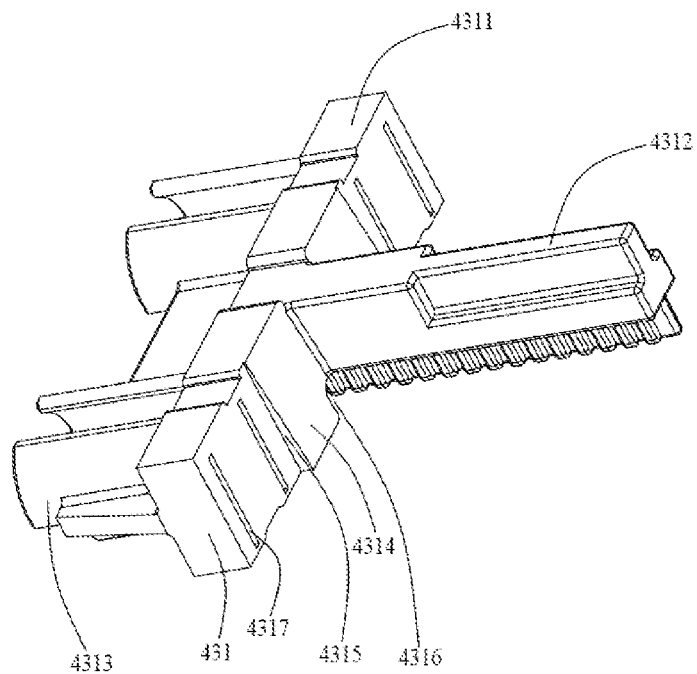
FIG. 5 is another perspective view of a main body of the converter shown in FIG. 4.

Referring to FIG. 4 and FIG. 5, the converter 43 slidably assembled in the housing 41 can slide along the guiding rail 412 of the housing 41 in the inserting direction of the battery pack 200. The converter 43 has a main body 431, a pair of inner contacts 432 horizontally received in the main body 431, and a pair of elastic members 433 sandwiched between the main body 431 and the sidewall 414 of the housing 41. The main body 431 sliding along the length direction of the housing 41 has a base 4311 for housing the inner contacts 432, a protruding portion 4312 and a pair of posts 4313 respectively extending from two opposite sides of the base 4311. The base 4311 extends along a width direction of the battery pack 200. The protruding position 4312 and the posts 4313 are respectively located at two opposite sides of the base 4311. The protruding portion 4312 and two posts 4313 extend away from each other. The protruding portion 4312 forwardly extends from the bottom middle of the base 4311. The protruding portion 4312 can slide in the guiding rail 412 of the housing 41 along a front-to-back direction and can be prevented from separating from the housing 41 by two ribs 415 of the housing 41. Two posts 4313 are horizontally located at two opposite ends of the base 4311 and configured with a hollow cylindrical shape for receiving the elastic members 433. The protruding portion 4312 can be pushed to drive the converter 42 slide along the length direction of the housing 41 to connect or disconnect the inner contacts 432 to the conductive terminals 421, so as to achieve the function of connecting the conductive terminals 421 with same polarity in parallel or isolating two conductive terminals 421 with same polarity.

Each elastic member 433 is sandwiched between the inner wall of corresponding post 4313 and the sidewall 414 of the housing 41. The converter 43 can slide along the length direction of the housing 41 under the driving of the protruding portion 4312 when external force is applied to the protruding portion 4312, so as to disconnect the inner contacts 432 to the conductive terminals 421. Therefore, two battery cell groups are in isolated state when the inner contacts 432 are not clamped by the contacting ends 4214 of the conductive terminals 421. When the external force is applied to the protruding portion 4312, the main body 431 moves backwardly and away from the terminals 42, the elastic members 433 are compressed by the main body 431 and has elastic deformation. When the external force is not applied to the protruding portion 4312, the main body 431 moves forwardly along the guiding rail 412 of the housing 41 under the elastic force caused by the elastic member 433 recovering from elastic deformation and the inner contacts 432 can be clamped by two contacting arms 4211 of the terminals 42, so as to connect two pair of conductive terminals 421 in parallel, therefore, two battery cell groups are connected with each other in parallel.

Preferably, the main body 431 has an anti-flip portion 4314 adjacently disposed at two opposite sides of the protruding portion 4312. The anti-flip portion 4314 inclinedly protrudes from the base 4311 and has a right-triangle side-surface 4315 for abutting corresponding sidewall of the receiving slot 411. A groove 4316 formed on the bottom of the main body 431 is adjacent to the protruding position 4312. The main body 431 also defines a pair of U-shaped receiving passages 4317 for receiving corresponding inner contacts 432. Each inner contact 432 configured with a U-shape defines a pair of connecting arms 4321 horizontally extending towards the corresponding terminals 42. Each connecting arm 4321 of the inner contact 432 is the provided with a rounded corner, so as to easily and quickly engage with or separate from corresponding connecting ends 4214 of the contacting arms 4211 of the conductive terminals 421, so that corresponding conductive terminals 421 with same polarity can be connected with each other in parallel or isolated to each other. Therefore, two battery cell groups can be switched between parallel connected state and isolated state through the connecting arms 4321 of the inner contacts 432 clamped or not clamped by the contacting ends 4214 of the conductive terminals 421. In initial state, the connecting arms 4321 are clamped by the contacting ends 4214 of conductive terminals 421 and two battery cell group are in parallel connected state, and the battery pack 200 can output a "n" voltage, referring to FIG. 10.

Figure 3:
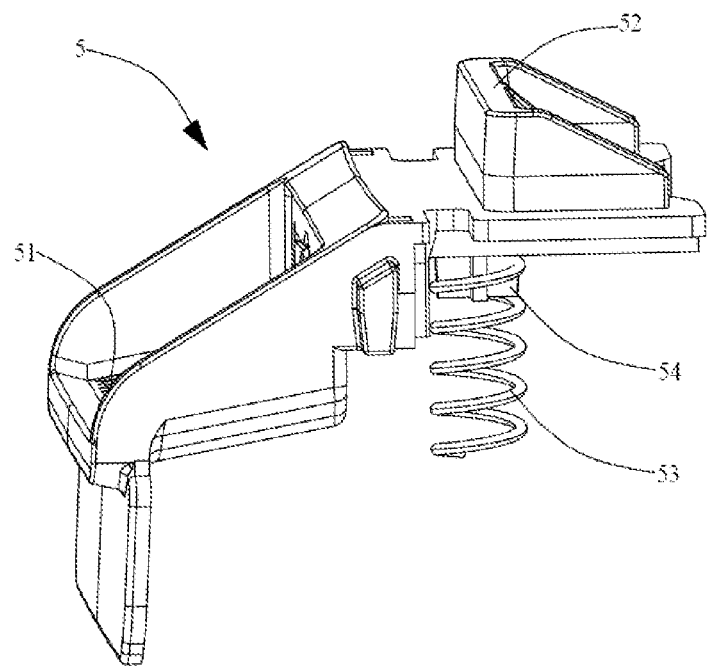
FIG. 3 is a perspective view of a locking assembly of the battery pack shown in in FIG. 2.

Referring to FIG. 3, the locking assembly 5 sandwiched between the upper cover 2 and the battery module 3 for locking or releasing the battery pack 200 includes a pressing portion 51, a locking portion 52 integrated with the pressing portion 51, a fixing column 54 located below the locking portion 52 and a spring 53 surrounded the fixing column 54. The locking portion 52 protrudes upon the top of the upper cover 2 and can matches with corresponding portion of power tool to lock the battery pack 200 to the power tool or release the battery pack 200 from the power tool. The locking portion 52 can move downwardly to release the battery pack 200 when the pressing portion 51 is downwardly pressed.

One end of the spring 53 is surrounded around the fixing column 54, the other end of the spring 53 is surrounded around the positioning portion 322 of the cell holder 32. Therefore, the spring 53 is sandwiched between the locking assembly 5 and the battery module 3. When the pressing portion 51 is downwardly pressed under the external force applied thereto, the locking portion 52 move downwardly together with the pressing portion 51 and the spring 53 is compressed and has elastic deformation. When external force is not applied on the pressing portion 51, the spring 53 recovers from elastic deformation and pushes the pressing and locking portions 51, 52 to move upwardly. So that the locking assembly 5 can move upwardly under the elastic force caused by the spring 53 recovering from elastic deformation. The locking assembly 5 can move downwardly and upwardly relative to the upper cover 2, so as to achieve the function of locking or releasing battery pack 200.

Figure 11:
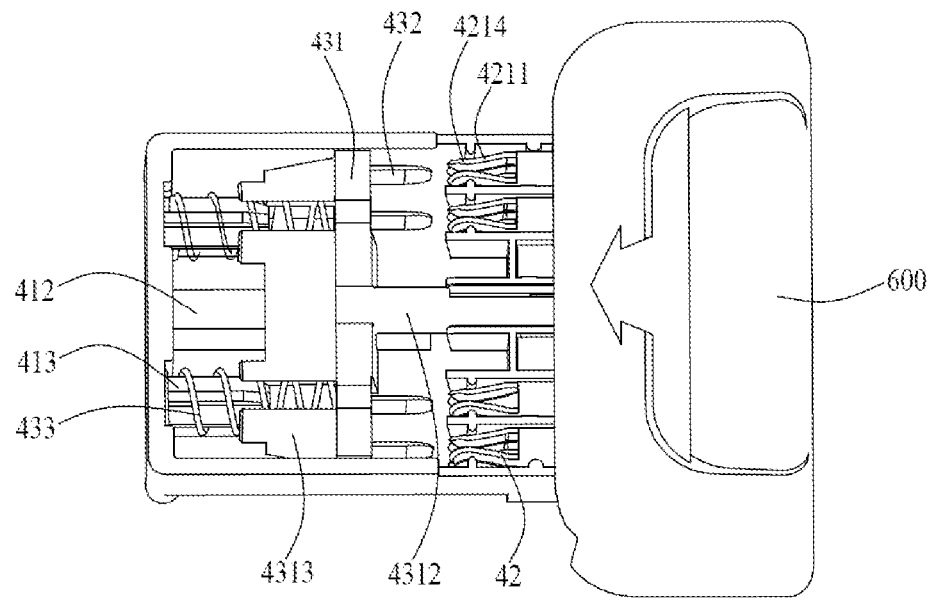
FIG. 11 is a top view of the battery pack transport system without an upper cover and the locking assembly of the battery pack shown in FIG. 1.
Figure 12:
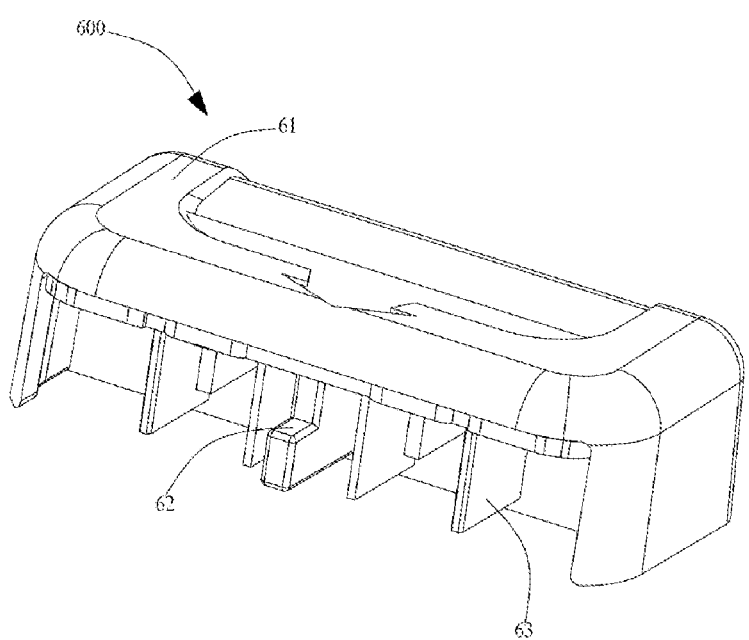
FIG. 12 is a perspective view of the protective member of the battery pack transport system in accordance with the first embodiment of the present invention.
Figure 13:
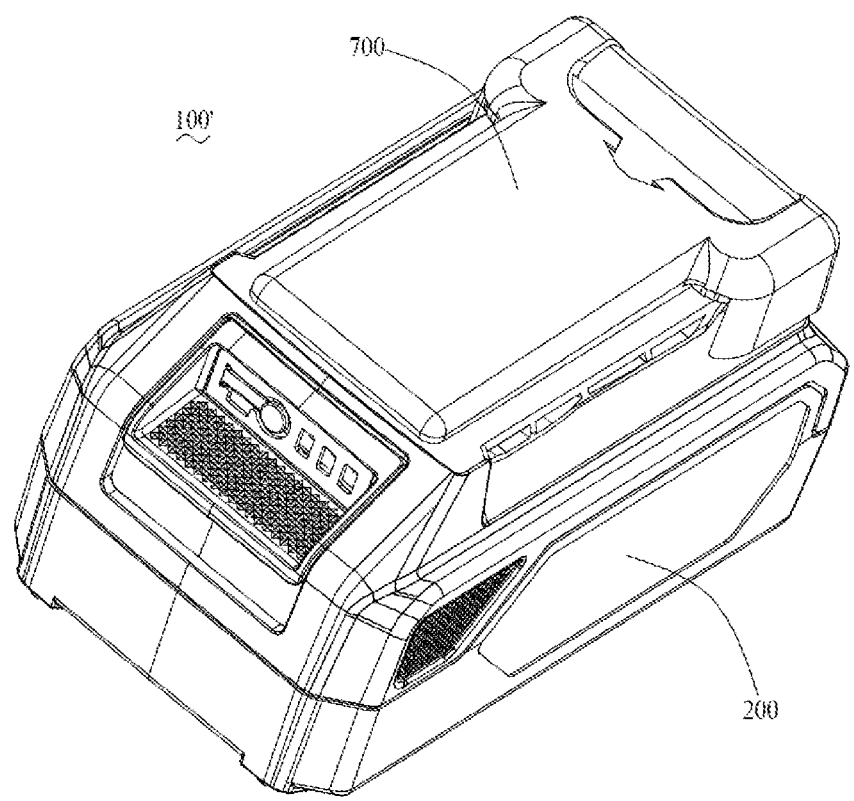
FIG. 13 is a perspective view of the battery pack transport system in accordance with a second embodiment of the present invention.
Figure 14:
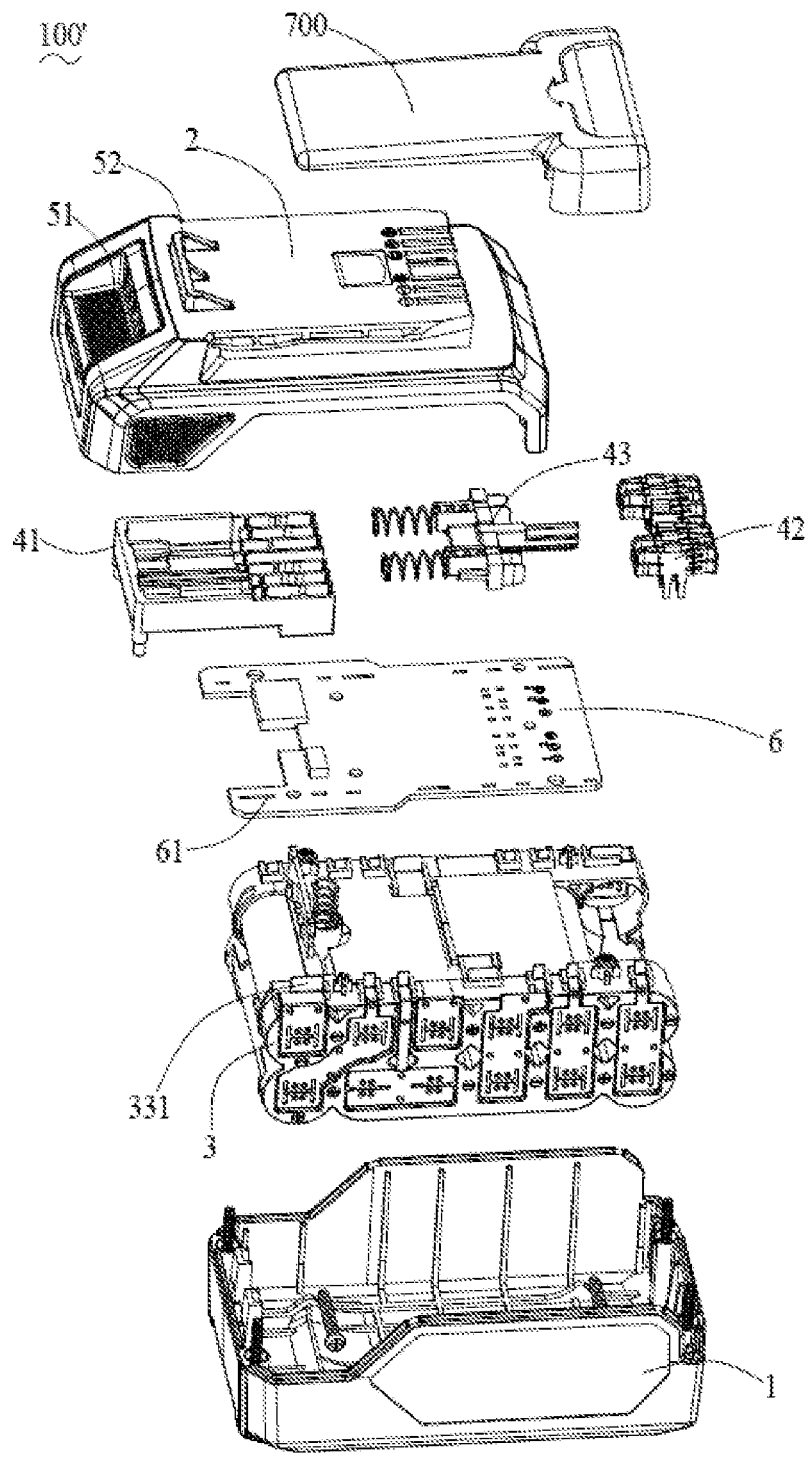
FIG. 14 is an exploded and perspective view of the battery pack transport system shown in FIG. 13.
Figure 15:
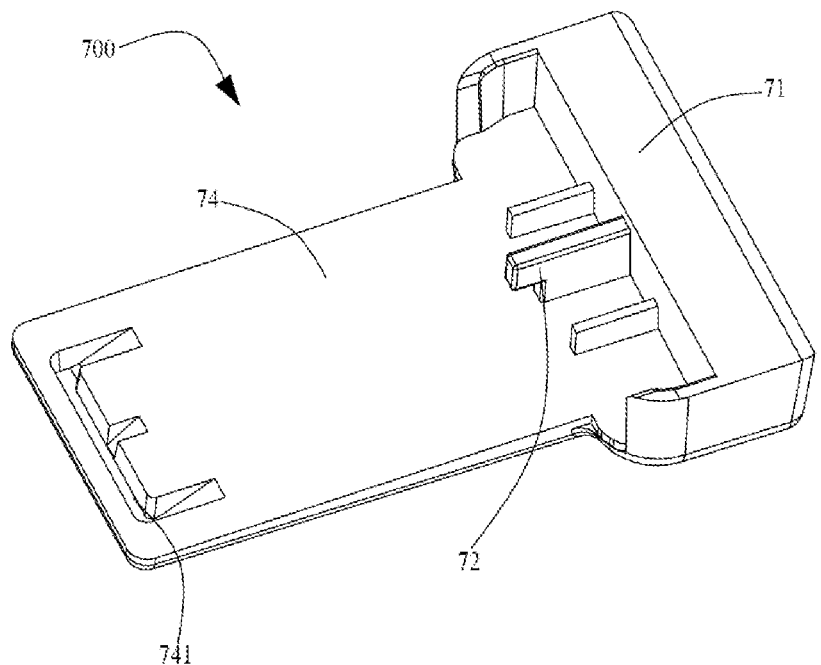
FIG. 15 is a perspective view of a body of a protective member of the battery pack transport system in accordance with the second embodiment of the present invention.
Figure 16:
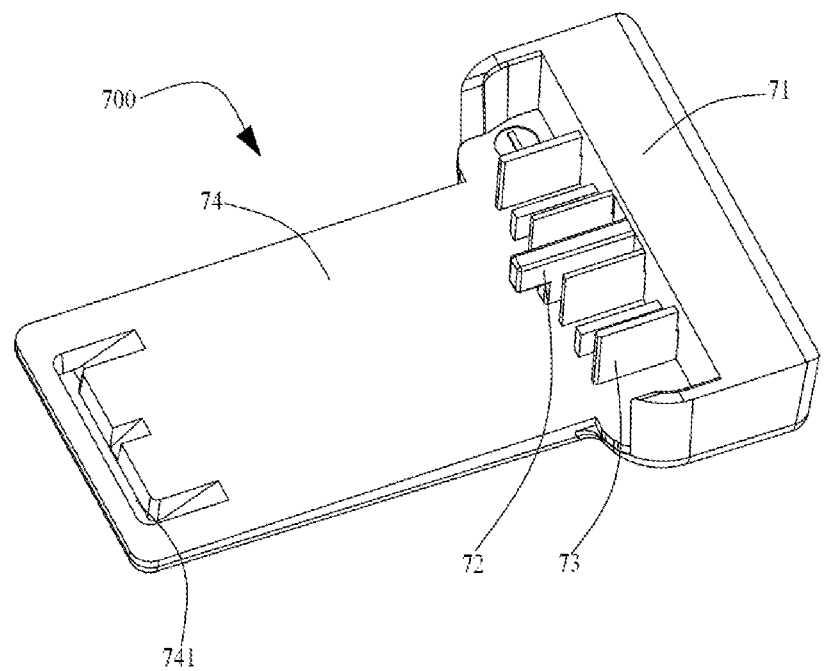
FIG. 16 is a perspective view of a protective member of the battery pack transport system in accordance with the second embodiment of the present invention.

Referring to FIG. 11 and FIG. 12, the protective member 600 according to the first embodiment of the present invention is assembled to the battery pack 200 to prevent the battery pack 200 from damaging during shipping. The protective member 600 coupled to the battery pack 200 through matching with the female connector 4 includes a body 61 extending along a width direction of the battery pack 200 and a plurality of inserting portions 63 receiving in the body 61. The body 61 covering the conductive terminals 421 of the female connector 4 defines a protrusion 62 corresponding to the protruding portion 4312 of the converter 43. The protrusion 62 forwardly extends from the bottom middle of the body 61. The inserting portions 63 each is located at the bottom of the body 61 corresponding to the terminals 42. When external force is applied to the protrusion 62, the protrusion 62 abuts against the protruding portion 4312 and pushes the protruding portion 4312 moving backwardly along the guiding rail 412 to separate the inner contacts 432 from the conductive terminals 421, and meanwhile the inserting portions 63 each is clamped by corresponding terminal 42 after passing through the corresponding through slot 21 of the upper cover 2, so that two conductive terminals 421 with same polarity are isolated with each other, and two battery cell groups are isolated with each other. Therefore, the battery pack 200 can be safely transported. The inserting portion 63 can be integrated with the body 61. Specifically, the body 61 is made of insulating material. The inserting portion 63 can be made of metallic material or insulating material. In other embodiment, the body 61 is made of metallic material, but the inserting portion 63 is made of insulating material.

FIG. 13 to FIG. 16 illustrate a transport system 100' according to a second embodiment of the present invention. The transport system 100' in the second embodiment is almost same with the transport system 100 in the first embodiment, except the protective member 700. The protective member 700 has same structure with the protective member 600 in the first embodiment, except further includes a connecting portion 74 forwardly extending along the length direction of the battery pack 200 from the body 71. The connecting portion 74 configured with a plate shape has a groove 741 depressed upwardly from the bottom thereof. The groove 741 can match with the locking portion 52 of the locking assembly 5 to fix the protective member 700 to the battery pack 200. When the external force is applied to the pressing portion 51 of the locking assembly 5, the pressing portion 51 moves downwardly and drives the locking portion 52 release from the protective member 700.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A battery pack transport system comprising:
a battery pack for providing electrical power to a power tool, the battery pack including a first cover; a second cover mounted to the first cover; a battery module received in a receiving space formed between the first and second covers and a female connector connected to the battery module, wherein the female connector has a converter slidably received therein, and wherein the converter includes a plurality of inner contacts, the battery module having two battery cell groups, each battery cell group configured with a plurality of cells and having a positive electrode and a negative electrode; the female connector having four conductive terminals respectively and electrically connected to positive and negative electrodes of two battery cell groups, and each of the four conductive terminals having respective first and second ends wherein the first end of each of the four conductive terminals is couplable to the power tool and the second end of each of the four conductive terminals is couplable to the inner contacts of the converter, and each inner contact is simultaneously connected to two conductive terminals with same polarity, and the two battery cell groups are connected with each other in parallel, and the female connector having a guiding rail and a pair of ribs, the ribs located at two opposite sides of the guiding rail; and
a protective member mechanically coupled to the battery pack to change the electrical connection of two conductive terminals with same polarity from parallel connected state to isolated state.

2. The battery pack transport system according to claim 1, wherein two battery cell groups are isolated with each other when the protective member is coupled to the battery pack.

3. The battery pack transport system according to claim 2, wherein the protective member has a plurality of inserting portions corresponding to the conductive terminals of the battery pack, and wherein the inserting portions each is connected to corresponding conductive terminal.

4. The battery pack transport system according to claim 1, wherein the converter includes a protruding portion forwardly extending therefrom, and the protective member defines a protrusion corresponding to the protruding portion, and wherein the protrusion abuts against the protruding portion to drive the converter move away from the conductive terminals.

5. The battery pack transport system according to claim 4, wherein the guiding rail receives the protruding portion of the converter, and wherein the protruding portion slides along the guiding rail when abutted by the protrusion of the protective member.

6. The battery pack transport system according to claim 5, wherein the converter has a plurality of posts opposite to the protruding portion and a plurality of elastic members respectively assembled to the corresponding post, and wherein the elastic members are sandwiched between the sidewall of the female connector and the converter.

7. The battery pack transport system according to claim 6, wherein the elastic members are compressed when the converter moves away from the conductive terminals under the pushing of the protective member, and wherein the elastic members recover from deformation to drive the converter mover towards the conductive terminals when the protective member is separate with the battery pack.

8. The battery pack transport system according to claim 7, wherein the battery pack has a locking portion protruding above the top of the upper cover, and wherein the protective member has a groove upwardly depressed from the bottom thereof for receiving the locking portion of the battery pack.

9. The battery pack transport system according to claim 3, wherein the battery pack has a locking portion protruding above the top of the upper cover, and wherein the protective member has a groove upwardly depressed from the bottom thereof for receiving the locking portion of the battery pack.

10. A battery pack for providing electrical power to a power tool, the battery pack comprising:
a first and second cover forming a receiving space together;
a battery module received in the receiving space and having two battery cell groups each including a plurality of cells connected in series, a positive electrode and a negative electrode;
a female connector electrically connected to the battery module and having four conductive terminals respectively and electrically connected to positive and negative electrodes, a converter electrically connecting two of the four conductive terminals with same polarity to make two battery cell groups connected in parallel, and each of the four conductive terminals having respective first and second ends wherein the first end of each of the four conductive terminals is couplable to the power tool and the second end of each of the four conductive terminals is couplable to inner contacts of the converter; and
a couple coupled to the female connector to make two battery cell groups isolated with each other through separating two connected conductive terminals with same polarity, the couple including a protrusion extending therefrom, the converter having a protruding portion corresponding to the protrusion, the female connector having a pair of ribs located at two opposite sides of the protruding portion.

11. A battery pack according to claim 10, wherein the female connector has a guiding rail for receiving the protrusion and the protruding portion.

12. A battery pack according to claim 10, wherein the converter has a plurality of inner contacts received therein, and wherein each inner contact is simultaneously connected to two adjacent conductive terminals with same polarity before the couple mounted to the female connector.

13. A battery pack according to claim 10, wherein the couple is removably assembled to the female connector, and wherein the couple has a plurality of inserting portion corresponding to the conductive terminals.

14. A battery pack according to claim 11, wherein the converter has at least one post located at opposite side of the protruding portion, and wherein the female connector has at least one positioning column corresponding to the post, and at least one elastic member is sandwiched between the positioning column and the post.

15. A battery pack according to claim 11, wherein the converter is slidably received in the female connector and moves in a front-to-rear direction along the guiding rail.

16. A battery pack according to claim 12, wherein the inner contacts are separate with corresponding two conductive terminals with same polarity when the couple mounted to the female connector.

17. A battery pack according to claim 10, wherein further includes a locking assembly sandwiched between the upper cover and the battery module.

18. A battery pack for providing electrical power to a power tool, the battery pack comprising:

a battery module having two battery cell groups each configured with a plurality of cells connected in series and having a positive electrode and a negative electrode;

a female connector connected to the battery module and having four conductive terminals connected to the positive and negative electrodes of the battery module to connect two battery cell groups in parallel through connecting two of the four conductive terminals with same polarity, wherein the female connector has a converter slidably received therein, and wherein the converter includes a plurality of inner contacts and each of the four conductive terminals having respective first and second ends wherein the first end of each of the four conductive terminals is couplable to the power tool and the second end of each of the four conductive terminals is couplable to the inner contacts of the converter, and the female connector having a guiding rail and a pair of ribs, the ribs located at two opposite sides of the guiding rail; and a couple engaging with the female connector to separate two parallel connected conductive terminals with same polarity from each other.

* * * * *